United States Patent [19]

DeGeus

[11] 4,262,483
[45] Apr. 21, 1981

[54] ROTATING HEAT PIPE SOLAR POWER GENERATOR

[76] Inventor: Arie M. DeGeus, 6625 4th St., S., St. Petersburg, Fla. 33705

[21] Appl. No.: 926,393

[22] Filed: Jul. 20, 1978

[51] Int. Cl.³ .................... F03G 7/02; F01K 25/06
[52] U.S. Cl. ................................ 60/641; 60/669; 60/531; 60/671
[58] Field of Search ............... 60/531, 641, 651, 669, 60/671

[56] References Cited

U.S. PATENT DOCUMENTS

| | | | |
|---|---|---|---|
| 1,804,694 | 5/1931 | Jones | 60/671 X |
| 3,514,942 | 6/1970 | Kyryluk | 60/641 |
| 4,069,673 | 1/1978 | Lapeyre | 60/641 |
| 4,081,965 | 4/1978 | Degeus | 60/641 |
| 4,165,614 | 8/1978 | Yeh | 60/531 |

Primary Examiner—Allen M. Ostrager
Assistant Examiner—Stephen F. Husar
Attorney, Agent, or Firm—Dressler, Goldsmith, Shore, Sutker & Milnamow, Ltd.

[57] ABSTRACT

A rotating heat pipe solar power generator is provided in which a heat pipe has a tube concentrically positioned within it to define an annular evaporation chamber, the tube being fixed to the pipe near one end thereof by the stator blades of a turbine. The heat pipe includes a large diameter evaporator section and a small diameter condenser section remote from the turbine. The tube extends into the entrance portion of the condenser section, and liquid is pumped into the evaporation chamber through an annular throat with a tapered annulus constituting the juncture between the two sections of the heat pipe, this throat serving as a centrifugal pump. The turbine is geared to the heat pipe so that both rotate.

10 Claims, 2 Drawing Figures

U.S. Patent  Apr. 21, 1981  4,262,483
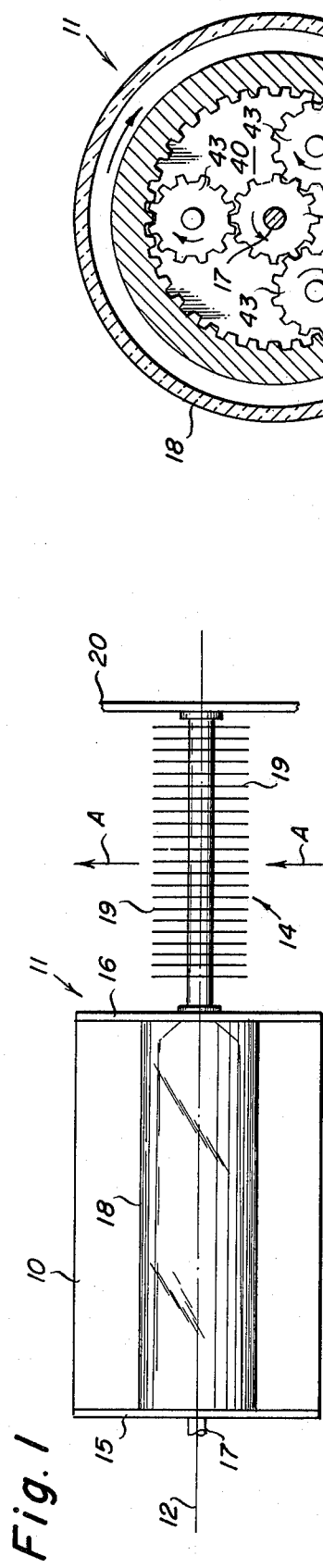
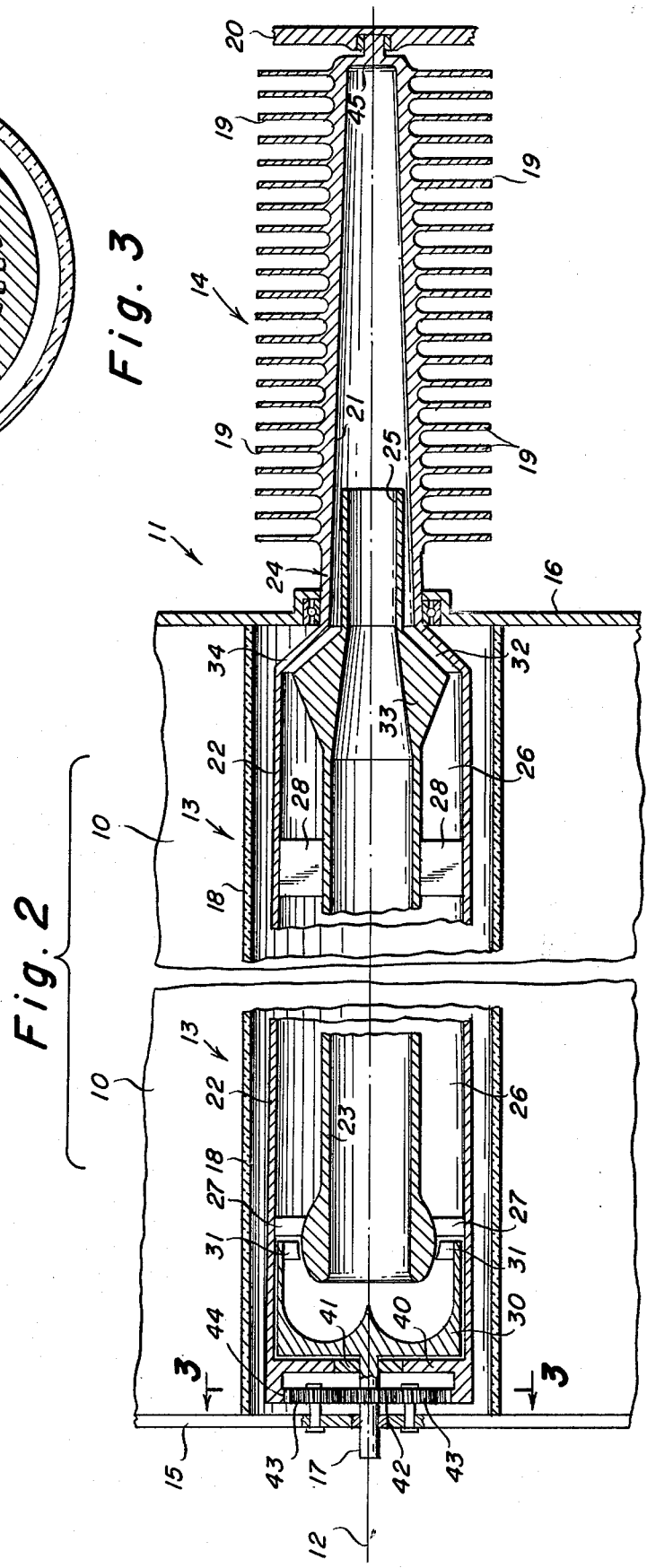

ROTATING HEAT PIPE SOLAR POWER GENERATOR

TECHNICAL FIELD

The present invention relates to apparatus for converting heat, and especially concentrated solar radiations, into rotary movement of a power take-off, for instance, allowing production of electrical energy.

BACKGROUND ART

Various devices for achieving the above purpose are known, but the apparatus of this invention achieves high conversion efficiency with a relatively simple structure.

DISCLOSURE OF INVENTION

In accordance with this invention, a rotating heat pipe solar power generator comprises a heat pipe carrying a tube concentrically positioned within the pipe to define an annular evaporation chamber between the two, this tube being fixed near one end to the heat pipe by means including stator blades forming part of a turbine. The heat pipe includes a relatively large diameter evaporator section (desirably positioned within a transparent cover) and a relatively small diameter condenser section remote from the turbine with the tube extending over the length of the evaporator section and into the entrance portion of the condenser section. The tube includes a section of enlarged diameter at the juncture of said evaporator and condenser sections to form an annular throat with a tapered annulus constituting said juncture which serves as a centrifugal pump. The heat pipe tapers outwardly in both sections thereof as these sections progress toward the turbine so that the vaporizable liquid condensed in the condenser section will be moved toward the throat by the centrifugal force imposed by the rotation of the heat pipe and tube. This provides a pressure seal at the throat and a film of vaporizable liquid in the evaporator section. Means are provided to heat the evaporator section of the heat pipe (normally a reflector), and the power take off means carries the rotor blades of the turbine. The choice of vaporizable liquid depends on the temperature that is normally achieved in the evaporator section. These preferably are mercury, toluene and thermex (a diphenyl-diphenyl oxide) eutectic mixture. At very low operating ambient temperature, ammonia is useful.

One important aspect of the conversion of solar radiation into electrical power is the fact that one must not only supply heat energy to the conversion apparatus, but heat must also be removed from the apparatus, and this cooling requirement is usually as difficult as the heating requirement. In this invention, the heat pipe is rotated, and this greatly facilitates removal of heat from the condenser section of the apparatus. Fins extending away from the condenser section are thus rotated in the coolant medium to enhance the movement of the coolant with respect to the condenser, and the removal of the heated coolant from the vicinity of the condenser. The heated coolant is normally air, and the hot air produced is itself useful for many purposes, for example, for heating living and storage areas. These fins may have a spiral structure and may be housed within a tubular housing to serve as a pump for the heated coolant. The apparatus can be applied in outer space using a suitable fluidum, such as ammonia. A conical radiation shield at an angle of about 45° with the centerline of the condenser and with its opening extending away from the evaporator section can be used. Wires may also be affixed to the interior of the condenser section and extend inwardly to enhance condensation of hot gases within the condenser and the centrifugal force on these wires will move the condensed liquid to the walls of the condenser.

The invention and its several features will be apparent from the accompanying drawings which illustrate a presently preferred construction.

BRIEF DESCRIPTION OF DRAWINGS

FIG. 1 is a plan view on a reduced scale showing the heat pipe and its relationship to a reflector used to concentrate solar radiation on the evaporator section of the heat pipe;

FIG. 2 is a longitudinal cross-section taken through the heat pipe and showing its construction; and FIG. 3 is a cross-section taken on the line 3—3 of FIG. 2 and showing the planetary gear system which enables the heat pipe to rotate in one direction while the rotor of the turbine and the take-off shaft connected thereto in the opposite direction. This system governs the transmission ratio between the power take-off and the heat pipe.

Referring to FIG. 1, the numeral 10 identifies a reflector having a heat pipe 11 mounted at its focus 12, the heat pipe 11 having an evaporator section 13 positioned within the reflector 10, and a condenser section 14. The diameter of the evaporator section 13 is relatively small with respect to the arc over which the reflector 10 extends so as to achieve sufficient concentration of the solar radiation. The reflector 10 has side walls 15 and 16 which rotatably support the heat pipe 11 and a power take-off shaft 17 extends through wall 15. The evaporator section 13 is disposed within a glass tubular housing 18 to reduce convection losses from the hot pipe, and the coolant airflow through the fins 19 carried by the condenser section 14 is shown by arrows A. In the form shown, the free end of the heat pipe is rotatably mounted in wall 20 which helps to confine the air flow.

The overall operation is simple. Radiant heat is concentrated on the evaporator section 13 which evaporates the liquid contained therein to provide vapor under pressure to drive a turbine positioned close to the take-off shaft 17. After expanding through the turbine, the vapor moves to the condenser section 14 where it is condensed and pumped back into the evaporator section 13. The heat pipe 11 rotates, which rotates the fins 19 to promote cooling.

Referring to FIG. 2, the rotating heat pipe solar power generator will now be described. The fluidum is in liquid form on the interior of tubular walls 21 of the condenser section 14 of the heat pipe 11. These walls 21 taper outwardly as we progress toward the turbine end of the heat pipe so that rotation of heat pipe 11 causes condensed fluidum on the walls 21 to move toward the turbine. This liquid is pumped by means discussed hereinafter into the evaporator section 13 of heat pipe 11 which is defined by tubular walls 22. These walls 22 also taper outwardly as we move toward the turbine so that liquid pumped into the evaporator section 13 flows in as a film against the inside wall of the pipe greatly increasing the heat transfer coefficient and so promoting evaporation.

The evaporator section 13 is bound within a glass tubular housing 18 to reduce convection losses as previously noted. Concentrically disposed within the evaporator section 13 is a tube 23 which extends over the length of the evaporator section 13 and into the entrance portion 24 of the condenser section 14. The portion of tube 23 which enters the condenser section 14 is identified at 25 and the liquid fluidum in the condenser 14 collects within the annular chamber formed between the entrance portion 24 and the portion 25 of tube 23.

The tube 23 and the evaporator section 13 of heat pipe 11 together define an annular chamber 26, and the liquid fluidum evaporates to fill this chamber and the gas moves longitudinally through chamber 26 to the turbine end of the heat pipe 11. The other end is closed at 45.

The tube 23 is fixed within the condenser section 13 of heat pipe 11 to rotate therewith. At the turbine end, the fixing is accomplished by stator blades 27, and spider elements 28 are also used to exactly position the tube 23.

It is here noted that the turbine could be positioned within the tube 23, but it is better to have the turbine in the annular chamber 26.

The turbine is completed by a rotor element 30 which carries rotor blades 31 adjacent the stator blades 27. It will be noted tha the stator blades rotate, but they are still termed stator blades because the rotor 30 spins faster and because the stator blades do not move relative to the heat pipe.

The vapor moving through the turbine is reversed by the rotor 30 and it then proceeds through the interior of tube 23 to the low pressure which exists in the cooled condenser section 14.

In order to prevent the pressure in chamber 26 from backing up into the condenser section 14, it is necessary to physically pump the liquid fluidum into the evaporation chamber, and this is done centrifically, as will now be described.

The liquid condenses as a film on walls 21 of condenser 14, and since these walls taper outwardly as we move toward the turbine, the spinning pipe forces the liquid to move away from the axis of rotation 12 and to flow into the accumulate at the entrance portion 24 outside the tube portion 25 which serves to prevent liquid from entering tube 23.

It will be observed that the condenser 14 is of smaller diameter than the evaporator section 13, and the change in size provides an annular throat 32 between an enlarged portion 33 in the tube 23 and a tapered annulus 34 where the evaporator and condenser sections join. The annular throat 32 preferably narrows at its exit end to insure that there is a back-up or reservoir of liquid in the throat 32.

As will be apparent, the liquid in the throat is spun and the greater angle of taper (roughly 45°) of the throat provides the desired centrifugal pumping action needed to overcome the pressure generated in the evaporation chamber 26.

It will be especially noted that the desired pumping action is achieved by the spin of pipe 11 and without any relative movement of the parts in the vicinity of the pump.

Since there is relative rotation between the heat pipe 11 and the glass enclosure 18, bearings (not shown) can be employed in the annular space between these two elements to help support the heat pipe.

Referring to the turbine end of the structure shown in FIG. 2, and also considering the planetary gear arrangement shown in FIG. 3, rotor 30 is carried by shaft 17 and the shaft is sealed to the closed end 40 of heat pipe 11 by means of a bearing 41. Shaft 17 carries a sun gear 42, and planetary gears 43 mounted on the wall 15 mesh with sun gear 42, on the one hand, and with ring gear 44 carried by an extension of heat pipe 11, so that the rotor 30 spins in one direction and the heat pipe 11 spins at a slower speed in the opposite direction.

In operation, vapor condenses on wall 21 and flows by centrifugal force toward the turbine, moving outside of tube portion 25. The liquid collects in throat 32 and is centrifugally pumped into evaporation chamber 26, forming a film on wall 22 and being evaporated by the heat supplied by reflector 10. The vapor so-provided moves past stators 27 to act upon rotors 31 to spin the rotor 30 and thereby power take-off shaft 17. The vapor of reduced pressure is then drawn through tube 23 to the condenser end 14 where the rotation of pipe 11 rotates fins 19 to provide the desired cooling which condenses the vapor.

Rotation of shaft 17 also serves to rotate the heat pipe 11 via sun gear 42, planetary gears 43 and the ring gear 44 on the heat pipe.

Mercury is a uniquely superior vaporizable liquid for use herein. Mercury possesses a very low heat of vaporization and a small volume of mercury liquid converts to a very large volume of gas. Also, mercury is liquid at room temperature and is easily condensed, but it nonetheless boils at only 357° C. at atmospheric pressure. Moreover, the removal of heat from the mercury is facilitated by its high conductivity. While other liquids may be used in the apparatus, such as toluene, ammonia, bromine, or one of the fluorinated hydrocarbons, mercury justifies its expense.

It will be appreciated that the choice of vaporizable liquid will be influenced by the ambient conditions. This will differ depending on the climate, and also with the altitude using mercury, and provided there is sufficient radiation concentration, overall efficiencies from 20-27% may be expected.

What is claimed is:

1. A rotating heat pipe solar power generator containing a liquid which forms a relatively large volume of gas when vaporized, comprising a heat pipe, a tube concentrically positioned within said pipe and fixed thereto to define an annular evaporation chamber between the two, said tube having stator blades fixed thereto, a rotor including rotor blades positioned near one end of said heat pipe, the other end of said heat pipe providing a relatively small diameter condenser section remote from said rotor, said concentrically positioned tube extending away from said rotor into the entrance portion of said condenser section and said tube including a section of enlarged diameter positioned at the juncture of said evaporation chamber and condenser section to form an annular throat with an annulus which tapers outwardly as one moves toward said rotor, said throat providing a centrifugal pump, said heat pipe tapering outwardly in both sections thereof as these sections progress toward said rotor so that the vaporizable liquid condensed in said condenser section will be moved toward said throat by the centrifugal force imposed by the rotation of the heat pipe and the tube, and a film of vaporizable liquid will be formed in said evaporation chamber, means for heating said evaporation chamber portion of said heat pipe, and power take off means carrying said rotor.

2. A rotating heat pipe as recited in claim 1 in which said evaporator section of said heat pipe is positioned within a transparent cover.

3. A rotating heat pipe as recited in claim 1 in which said reflector means are provided to concentrate solar radiation on the evaporator section of the heat pipe.

4. A rotating heat pipe as recited in claim 1 in which said vaporizable liquid is mercury.

5. A rotating heat pipe as recited in claim 1 in which the stator blades of said turbine extend across said annular evaporation chamber and help to fix said tube with respect to said heat pipe.

6. A rotating heat pipe as recited in claim 1 in which the rotor of said turbine drives a sun gear which is interconnected with said heat pipe by means of planetary gears carried by a side wall of a reflector.

7. A rotating heat pipe as recited in claim 1 in which said condenser section carries outwardly extending cooling fins.

8. A rotating heat pipe as recited in claim 1 in which said vaporizable liquid is toluene.

9. A rotating heat pipe as recited in claim 1 in which said vaporizable liquid is a diphenyl-diphenyl oxide eutectic mixture.

10. A rotating heat pipe as recited in claim 1 in which said vaporizable liquid is ammonia.

* * * * *